United States Patent
Duong et al.

(10) Patent No.: US 9,957,825 B2
(45) Date of Patent: May 1, 2018

(54) NON-LINEARLY DEFLECTING BRUSH SEAL LAND

(71) Applicant: United Technologies Corporation, Hartford, CT (US)

(72) Inventors: Loc Quang Duong, San Diego, CA (US); Xiaolan Hu, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 240 days.

(21) Appl. No.: 15/016,007

(22) Filed: Feb. 4, 2016

(65) Prior Publication Data
US 2016/0153301 A1 Jun. 2, 2016

Related U.S. Application Data

(63) Continuation of application No. PCT/US2014/056983, filed on Sep. 23, 2014.
(Continued)

(51) Int. Cl.
*F16J 15/32* (2016.01)
*F01D 11/00* (2006.01)
(Continued)

(52) U.S. Cl.
CPC .............. *F01D 11/00* (2013.01); *F01D 5/081* (2013.01); *F01D 11/001* (2013.01);
(Continued)

(58) Field of Classification Search
CPC . F16J 15/3288; F05D 2240/56; F01D 11/001; F01D 11/02; F02C 7/28
See application file for complete search history.

(56) References Cited

U.S. PATENT DOCUMENTS 3,514,112 A * 5/1970 Pettengill, Jr. .......... F01D 11/02
277/303
5,181,728 A * 1/1993 Stec ...................... F01D 11/001
277/355
(Continued)

FOREIGN PATENT DOCUMENTS

EP 1209389 5/2002
EP 1559873 8/2005

OTHER PUBLICATIONS

Extended European Search Report dated May 19, 2017 in European Application No. 14852811.0.
(Continued)

*Primary Examiner* — Nicholas L Foster
(74) *Attorney, Agent, or Firm* — Snell & Wilmer L.L.P.

(57) ABSTRACT

A brush seal land is disclosed. The brush seal land may comprise a first portion configured to be coupled to a turbine disc of an aircraft engine and a second portion having a contact surface. The brush seal land may comprise a concave annular structure. The second portion may deflect through a clearance area in response to contact with a brush. The second portion may not deflect in response to contact with a brush after the second portion has deflected through a clearance area in response to contact with the brush. The contact surface comprises tungsten carbide. The brush seal land may comprise INCONEL. The brush seal land may be configured to be coupled to an annular member extending from the turbine disc. The brush seal land may reduce abrasion to an annular member extending from the turbine disc by a brush.

14 Claims, 3 Drawing Sheets

Related U.S. Application Data

(60) Provisional application No. 61/889,959, filed on Oct. 11, 2013.

(51) Int. Cl.
 *F16J 15/3288* (2016.01)
 *F01D 5/08* (2006.01)

(52) U.S. Cl.
 CPC ....... *F16J 15/3288* (2013.01); *F05D 2220/32* (2013.01); *F05D 2240/56* (2013.01); *Y02T 50/676* (2013.01)

(56) References Cited

U.S. PATENT DOCUMENTS

| | | | |
|---|---|---|---|
| 5,474,306 A | 12/1995 | Bagepalli et al. | |
| 5,522,698 A * | 6/1996 | Butler | F01D 11/001 277/355 |
| 5,568,931 A * | 10/1996 | Tseng | F16J 15/3288 277/355 |
| 6,059,526 A | 5/2000 | Mayr | |
| 6,168,377 B1 | 1/2001 | Wolfe et al. | |
| 6,186,508 B1 | 2/2001 | Zajchowski et al. | |
| 6,471,213 B1 * | 10/2002 | Yuri | F01D 11/02 277/355 |
| 6,644,668 B1 * | 11/2003 | Albers | F01D 11/001 277/355 |
| 6,991,235 B2 | 1/2006 | Ebert et al. | |
| 7,066,470 B2 | 6/2006 | Turnquist et al. | |
| 7,290,769 B2 | 11/2007 | Plona et al. | |
| 7,445,424 B1 * | 11/2008 | Ebert | F01D 5/081 415/113 |
| 7,862,047 B2 | 1/2011 | Beichl et al. | |
| 8,162,323 B2 | 4/2012 | Nicholson et al. | |
| 8,382,120 B2 | 2/2013 | Deo et al. | |
| 2002/0060432 A1 * | 5/2002 | Webster | F01D 11/025 277/411 |
| 2004/0026869 A1 | 2/2004 | Addis | |
| 2004/0256807 A1 | 12/2004 | Bhate et al. | |
| 2006/0275106 A1 * | 12/2006 | Alvanos | F01D 5/082 415/110 |
| 2009/0039604 A1 | 2/2009 | Beichl et al. | |
| 2010/0253003 A1 * | 10/2010 | Durling | F01D 11/001 277/300 |
| 2013/0033008 A1 | 2/2013 | Martin et al. | |
| 2013/0200569 A1 | 8/2013 | Franceschini | |

OTHER PUBLICATIONS

International Search Report and Written Opinion dated Dec. 16, 2014 in Application No. PCT/US2014/056983.

International Preliminary Report on Patentability dated Sep. 24, 2015 in Application No. PCT/US2014/056983.

* cited by examiner

NON-LINEARLY DEFLECTING BRUSH SEAL LAND

CROSS-REFERENCE TO RELATED APPLICATIONS

This application is a continuation of, claims priority to and the benefit of, PCT/US2014/056983 filed on Sep. 23, 2014 and entitled "NON-LINEARLY DEFLECTING BRUSH SEAL LAND," which claims priority from U.S. Provisional Application No. 61/889,959 filed on Oct. 11, 2013 and entitled "NON-LINEARLY DEFLECTING BRUSH SEAL LAND." Both of the aforementioned applications are incorporated herein by reference in their entirety.

FIELD OF INVENTION

The present disclosure relates to gas engine turbines, and more particularly, to a non-linearly deflecting brush seal land.

BACKGROUND OF THE INVENTION

Gas turbine engines (such as those that power modern commercial and military aircraft) typically include one or more seals between high and low pressure gas flow paths. For example, many systems incorporate one or more brush seals to limit uncontrolled air flow into the compressor, combustor, and/or turbine. Conventional brush seals are often placed between rotating parts and non-rotating parts of an engine, such as between a turbine disc and a nozzle structure.

SUMMARY OF THE INVENTION

A brush seal land is disclosed. The brush seal land may comprise a first portion configured to be coupled to a turbine disc of an aircraft engine and a second portion having a contact surface. The brush seal land may comprise a concave annular structure. The second portion may deflect through a clearance area in response to contact with a brush. The second portion may not deflect in response to contact with a brush after the second portion has deflected through a clearance area in response to contact with the brush. The contact surface may comprise tungsten carbide. The brush seal land may comprise an austenitic nickel-chromium alloy such as that sold under the mark INCONEL (e.g., INCONEL 600, 617, 625, 718, X-750 and others). The brush seal land may be configured to be coupled to an annular member extending from the turbine disc. The brush seal land may reduce abrasion to an annular member extending from the turbine disc by a brush. A brush seal comprising the brush seal land and a brush may separate a high pressure zone from a low pressure zone. The first portion may be coupled to the turbine disc by pressure.

A brush seal is disclosed. The brush seal may comprise a brush seal land configured to be coupled to an annular member extending from a turbine disc and a brush configured to make contact with the brush seal land. The brush seal land may comprise a concave annular structure. The brush seal land may comprise a first portion configured to be coupled to the annular member extending from the turbine disc. The brush seal land may comprise a second portion that deflects through a clearance area in response to contact with the brush. The brush seal land may comprise a second portion that does not deflect in response to contact with a brush after the second portion has deflected through a clearance area in response to contact with the brush. The brush may deflect in response to contact with the brush seal land. The brush seal land may comprise an austenitic nickel-chromium alloy such as that sold under the mark INCONEL (e.g., INCONEL 600, 617, 625, 718, X-750 and others). The brush seal land may comprise a contact surface configured to make contact with the brush. The contact surface may comprise tungsten carbide. The brush seal land and the brush may separate a high pressure zone from a low pressure zone. The brush seal land may comprise a first portion that is coupled to the turbine disc by a pressure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight.

Figure 1:
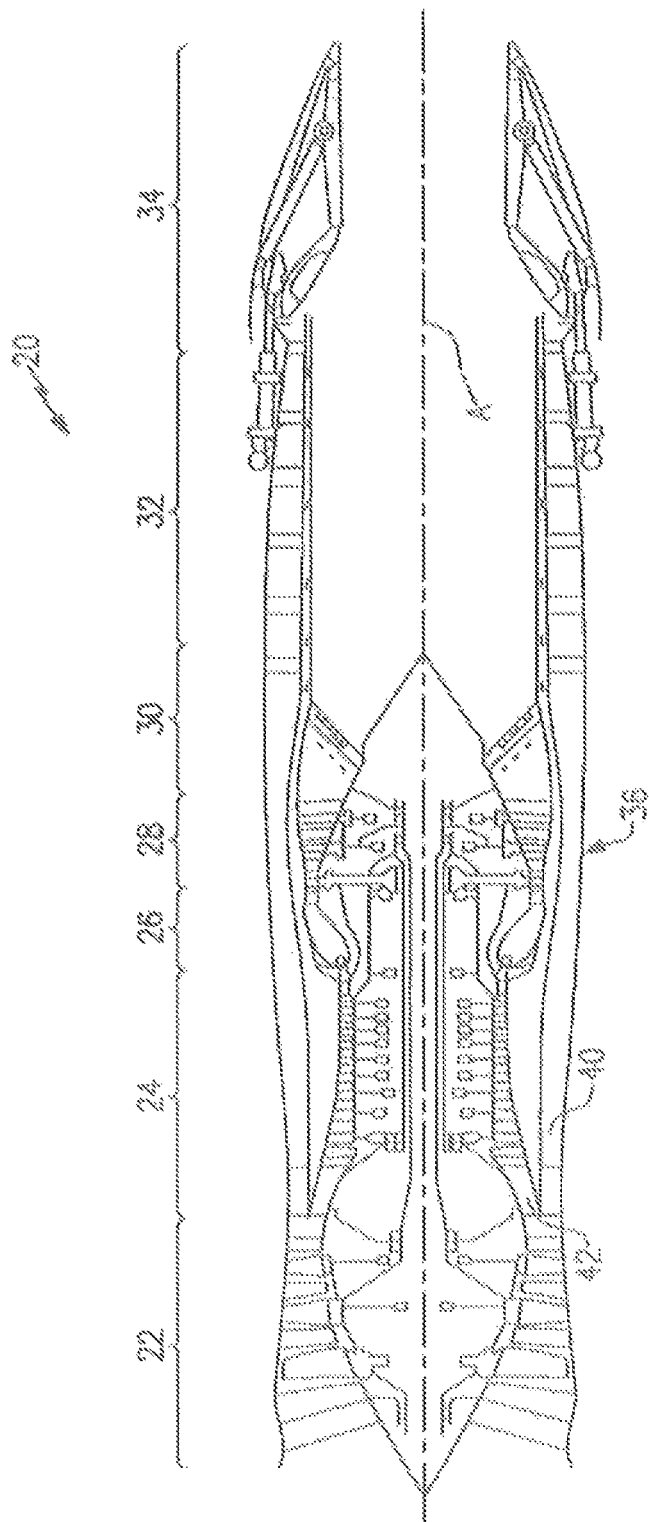
FIG. 1 illustrates, in accordance with various embodiments, a cross-sectional view of a conventional gas turbine engine.

Referring to FIG. 1, a gas turbine engine 20 is shown. In various embodiments, the gas turbine engine 20 comprises a two-spool low-bypass augmented turbofan. The turbofan generally incorporates a fan section 22, a compressor section 24, a combustor section 26, a turbine section 28, an augmenter section 30, an exhaust duct section 32, and a nozzle system 34, along a central longitudinal engine axis A. Axis A extends from a forward position at fan section 22 to a more aft position at nozzle system 34. Although depicted as an augmented low bypass turbofan in the non-limiting embodiment of FIG. 1, it should be understood that the concepts described herein are applicable to other gas turbine engines including non-augmented engines, high bypass turbofan engines, geared architecture engines, direct drive turbofans, turbojet, turboshaft, multi-stream variable cycle adaptive engines, and other engine architectures.

An engine case structure 36 defines a generally annular secondary airflow path 40 around a core airflow path 42. Various case structures and modules may define the engine case structure 36 which defines an exoskeleton to support the rotational hardware.

Air that enters the fan section 22 is divided between a core primary air flow through the core air flow path 42 and a secondary air flow through a secondary air flow path 40. The core air flow passes through the combustor section 26, the turbine section 28, then the augmentor section 30 where fuel may be selectively injected and burned to generate additional thrust through the nozzle system 34. It should be appreciated that additional air flow streams such as a third stream air flow typical of variable cycle engine architectures may additionally be sourced from the fan section 22.

The secondary air flow may be utilized for multiple purposes including, for example, thrust, cooling and pressurization. The secondary air flow may be any air flow different from the core or primary air flow. The secondary air flow may ultimately be at least partially injected into the core air flow path 42 at various points to be used, for example, to cool various components. Air may flow within the core airflow path 42 at a velocity and pressure different from that within the secondary airflow path 40.

The exhaust duct section 32 may be circular in cross-section, such as in an axisymmetric augmented low bypass turbofan or may be non-axisymmetric in cross-section including, for example, a serpentine shape to block direct view to the turbine section 28. In addition to the various cross-sections and the various longitudinal shapes, the exhaust duct section 32 may terminate in a Convergent/Divergent ("C/D") nozzle system, a non-axisymmetric two-dimensional (2D) C/D vectorable nozzle system, a flattened slot nozzle of high aspect ratio or other nozzle arrangement.

In various embodiments, a compressor and/or turbine may comprise one or more compressor and/or turbine stages, respectively. For example, a turbine may comprise multiple sets of rotating blades and stationary vanes. Each set may comprise a turbine stage. Likewise, a compressor may comprise multiple sets of rotating blades and stationary vanes. Each set may comprise a compressor stage. Further, in various embodiments, a set of blades and/or vanes may be coupled about a circumference of a generally circular central disc (e.g., a turbine disc in the case of a turbine and/or a compressor disc in the case of a compressor). The blades may thus rotate with the disc.

Figure 2:
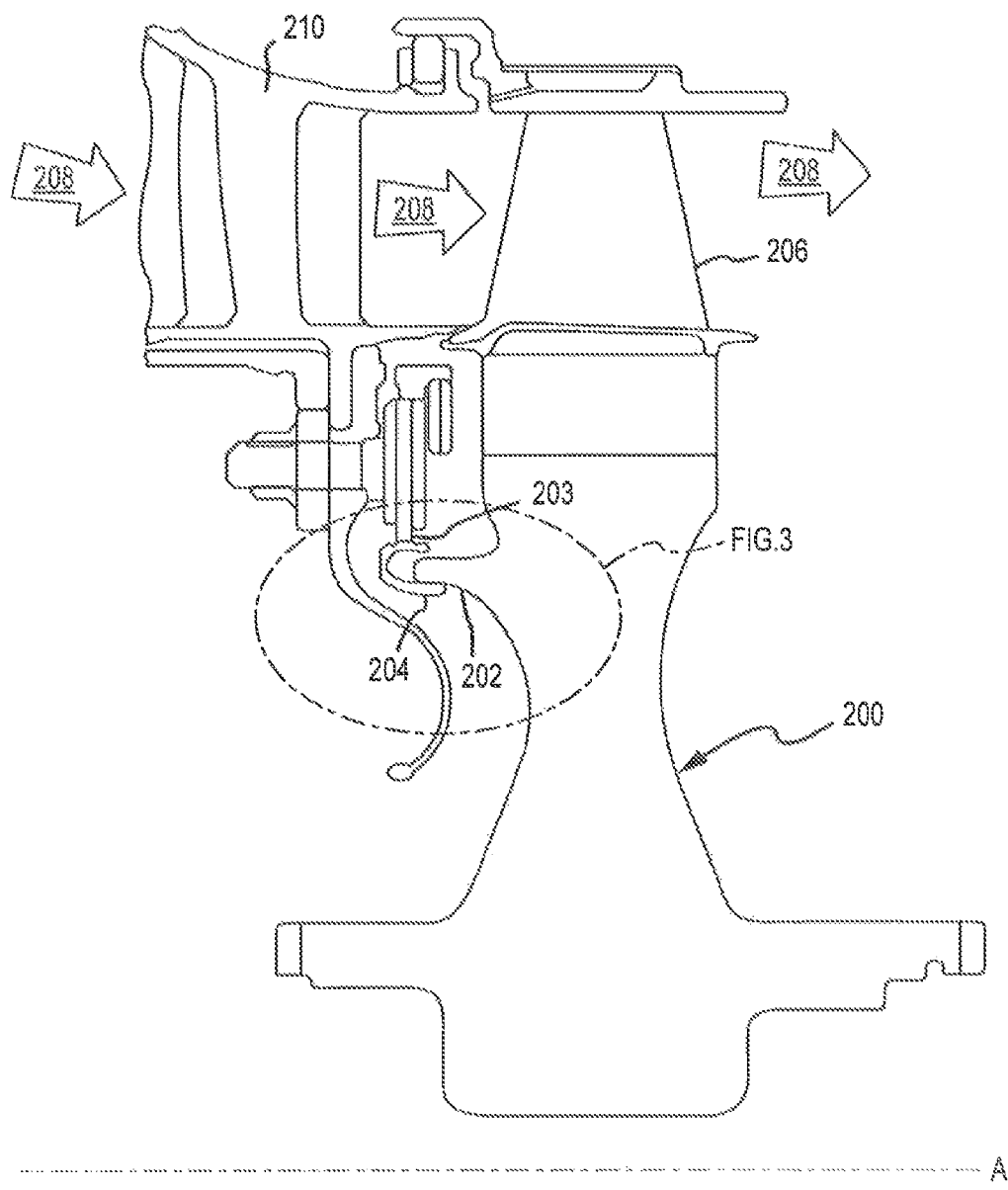
FIG. 2 illustrates, in accordance with various embodiments, a first cross-sectional view of a turbine disc coupled to a non-linearly deflecting brush seal land.
Figure 3:
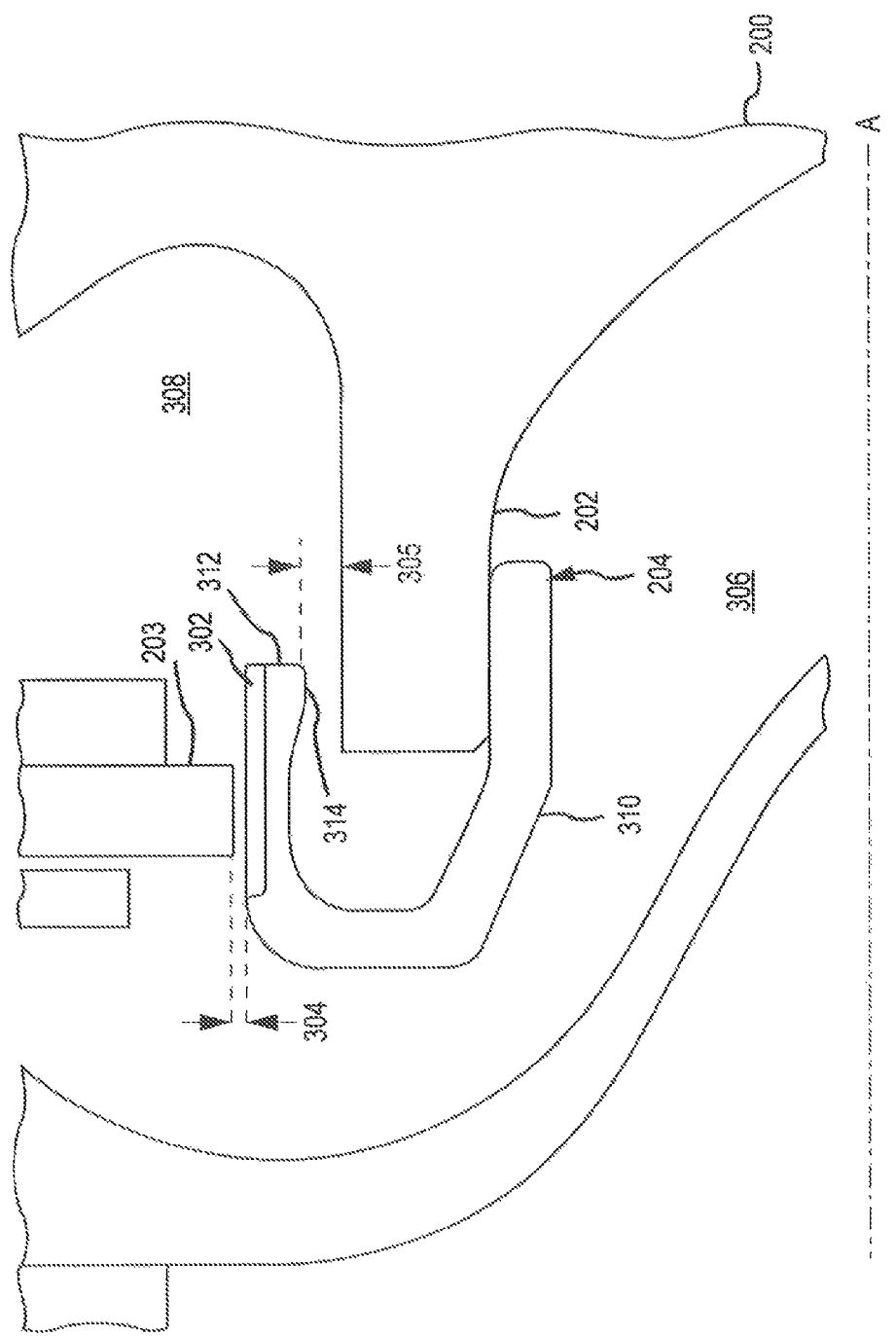
FIG. 3 illustrates, in accordance with various embodiments, a second cross-sectional view of a turbine disc coupled to a non-linearly deflecting brush seal land.

With general reference to FIGS. 2 and 3, a turbine disc 200 is shown. The turbine disc 200 may comprise an axially extending annular member 202 (or "short wing"). The annular member 202 may extend axially away from the turbine disc (parallel or substantially parallel to the axis A) and in a forward and/or aft direction to form a circumferential surface or ring. The annular member 202 may be coupled to a brush seal land 204.

As used herein, a "brush seal land" 204 may comprise any generally annular structure having a surface capable of making contact with a brush, as described below. Accordingly, the brush seal land 204 may comprise a convex or concave ring or annulus. The brush seal land 204 may be coupled circumferentially about the annular member 202 to extend axially away from the annular member 202 (parallel or substantially parallel to the axis A) in a forward and/or aft direction. Accordingly, the brush seal land 204 may form an annulus or ring about the annular member 202. In axial cross-section, as shown, the brush seal land 204 may have a curving "C" shaped or a "U" shaped profile.

With reference to FIG. 3, the brush seal land may further comprise a first portion 310 and a second portion 312. The first portion 310 may be situated radially inward, (i.e., perpendicular to the axis A) of the second portion 312. The brush seal land 204 may, in various embodiments, comprise a stress relief slot, such as a depression, dip, or concavity, which may be formed in a surface (such as a radially outer surface) of the second portion 312.

In various embodiments, the brush seal land may comprise any of a variety of suitable alloys, including, for example, various INCONEL as described above. The brush seal land 204 may also comprise one or more materials or alloys different from those used in the manufacture of the turbine disc 200. Further, the second portion 312 of brush seal land 204 may be tapered to compensate for deflection and/or deformation induced by rotational momentum of the brush seal land 204. The thickness and/or curvature of the brush seal land 204 may also be varied to tune or adjust the natural vibrational frequency of the brush seal land 204 such that it is outside the frequency range of its excitation source (e.g., the turbine disc 200).

The brush seal land 204 and the annular member 202 may be joined or coupled in any manner that is suitable. For example, a pressure may be applied about the first portion 310 of the brush seal land 204 and the annular member 202 to create a bond between the first portion 310 of the brush seal land 204 and the annular member 202. The brush seal land 204 may be thus pressure fitted or pressure bonded to the annular member 202. In various embodiments, the brush seal land 204 may be joined to the annular member 202 by a heat bond, an adhesive, one or more coupling members, such as one or more rivets, any combination of the foregoing, and the like.

With particular attention to FIG. 3, a brush seal comprising the brush seal land 204 and a brush 203 is shown. The brush 203 may be situated adjacent to a contact surface 302 of the brush seal land 204. The brush 203 may comprise a plurality of bristles. These bristles may comprise a variety of metallic and/or other materials, such as, for example, steel. The contact surface 302 may comprise any of a variety of suitable materials and/or alloys, including, for example, tungsten carbide and/or INCONEL alloys as described herein. As shown at FIG. 2, the contact surface 302 may be joined to the brush seal land 204. For example, the contact surface 302 may be joined to the brush seal land 204 by a pressure bonding process, a heat bonding process, by an adhesive, by a rivet or weld, and the like. In various embodiments, the contact surface 302 may be integral to (e.g., forged or manufactured as part of) the brush seal land 204. Further, in various embodiments, the contact surface 302 may comprise a coating, such as a coating applied through physical vapor deposition, sputtering, and the like. In various embodiments, a tungsten carbide coating is used as contact surface 302.

A clearance 304 may separate the brush 203 from the contact surface 302 of the brush seal land 204. Similarly, a clearance 305 may separate a surface 314 of the brush seal land 204 opposite the contact surface 302 from the annular member 202.

During operation, combustion gas exiting the combustion section 26 of the engine 20 may turn a turbine blade 206 coupled to the turbine disc 200 (together these may be referred to herein as a "rotor") such that the blade 206 and disc 200 rotate about the axis A in response the flow of combustion gas within the gas path 208 and over the surface of the blade 206. A vane 210 disposed forward of the turbine blade 206 may be included to guide combustion gas within the gas path 208.

With reference to FIG. 2, as hot combustion gas flows over the turbine blade 206, the thermal environment surrounding the turbine blade 206 and turbine disc 200 may vary, causing one or more components within the engine 20 (e.g., the turbine blade 206 and disc 200) to expand and contract. Further, as the turbine blade 206 and/or turbine disc 200 pass through high rotational speeds, the turbine blade 206 and/or turbine disc 200 may excurse radially. Radial excursion of this type may be referred to herein as "rotor eccentricity," in that the eccentricity of the rotational path followed by the rotor may increase (towards a more elliptical path) in response to the forces and stresses described above. Thus, a variety of factors may cause the turbine disc 200 and/or the turbine blade 206 (among other components) to undergo radial excursion.

During operation, it is desirable to maintain an appropriate gas velocity and pressure within the gas path 208, which may comprise a low pressure (high gas velocity) zone 308. To ensure appropriate gas velocity and pressure, the low pressure zone 308 may be isolated from a high pressure (low gas velocity) zone 306 of the engine 20. Specifically, and with reference to FIG. 3, a brush seal comprising a brush 203 and a brush seal land 204 may be disposed between the high pressure zone 306 and the low pressure zone 308.

A clearance 304 may separate the brush 203 from the contact surface 302 of the brush seal land 204. During normal operation, the brush seal land 204 may rotate (with the turbine disc 200) radially inward, i.e., perpendicular to the axis A, of the brush 203. Thus, the brush 203 may not come into contact with the contact surface 302 of the brush seal land 204.

However, during radial excursion the rotor, the contact surface 302 of the brush seal land 204 may make contact with the brush 203. In this manner, brush 203 and member 202 do not make contact. Rather, the brush seal land 204 is exposed to the brush 203, thereby reducing or eliminating abrasion, such as by the brush 203 coming into contact with annular member 202. Further, as the contact surface 302 of the brush seal land 204 may comprise a heat tolerant and/or hardened alloy (such as tungsten carbide and/or INCONEL alloys as described herein) the contact surface 302 may be constructed to withstand the heat and abrasion produced as a result of the rotation of the brush seal land 204 against the brush 203. The lifetime of the member 202 may therefore be improved by the use of the brush seal land 204.

Continuing, as the brush 203 and brush seal land 204 make contact, the second portion 312 of the brush seal land 204 may be compressed or deflected by the brush 203, and/or the brush 203 may be compressed or deflected by the brush seal land 204. In particular, each of the brush 203 and the second portion 312 of the brush seal land 204 may act as a spring. The second portion 312 of the brush seal land 204 may therefore deflect the brush 203, and the brush 203 may, in turn, deflect the second portion 312 of the brush seal land 204.

In various embodiments, the second portion 312 of the brush seal land 204 and the brush 203 may have the same radial rigidity or stiffness (or substantially a same radial rigidity or stiffness). The deflection of the second portion 312 of the brush seal land 204 may therefore increase linearly or substantially linearly in response to a force applied to its contact surface 302 by the brush 203. The deflection of the brush 203 may likewise increase linearly or substantially linearly in response to a force applied to its bristles by the contact surface 302 of the brush seal land 204. In other words, in various embodiments, the second portion 312 of the brush seal land 204 may deflect or compress radially by substantially the same distance that the brush 302 deflects or compresses radially in the opposite direction. The brush seal land 204 may thus accommodate variations in flight and temperature which might otherwise increase wear and abrasion on the brush seal land 204.

In various embodiments, the second portion 312 of the brush seal land 204 and the brush 203 may not have a same radial stiffness or rigidity. In this case, deflection of the second portion 312 of the brush seal land 204 and the deflection of the brush 203 may not increase linearly in response to an applied force. Rather, in various embodiments, deflection of the second portion 312 of the brush seal land 204 and/or the deflection of the brush 203 may vary non-linearly in response to a compressive force exerted against one of these components by the other.

Specifically, as the contact surface 302 of the brush seal land 204 makes contact with the brush 203, the brush 203 and the second portion 312 of the brush seal land 204 may deflect in response to the force generated through contact with one another. As the compressive force(s) urging the components into contact increases, the deflection of the second portion 312 of the brush seal land 204 may increase linearly in response to the force applied until the clearance 305 between the second portion 312 of the brush seal land 204 and the member 202 is reduced substantially to zero, whereupon the second portion 312 of the brush seal land 204 comes into contact with the annular member 202. The annular member 202 may be much stiffer radially than the second portion 312 of the brush seal land 204.

In an embodiment, the radial stiffness of the second portion 312 of the brush seal land 204 may be bolstered by the radial stiffness of the supporting member 202, such that, for example, the brush seal land 204 is no longer deflected by the brush 203. Rather, where the second portion 312 of the brush seal land 204 has come into contact with the annular member 202, only the brush 203 may be capable of further deflection. The brush seal land 204 may thus display a non-linear deflection characteristic, in that the second portion 312 of the brush seal land 204 is only capable of deflection through the clearance 305 in response to a force applied to its surface 302 by the brush 203, and having deflected through the clearance 305, the second portion 312 of the brush seal land 204 may be stayed by the member 202 from further deflection.

The brush seal land 204 may therefore, as described above, exhibit a first radial stiffness as it deflects through the clearance 305 and a second, increased, radial stiffness as it comes into contact with the annular member 202. The brush seal land 204 may exhibit the second, increased, radial stiffness in response to a large radial excursion by the rotor (e.g., in response to adverse conditions). The increased radial stiffness may act to impede further radial excursion by the rotor. Thus, the brush seal land 204 may permit some radial excursion by the rotor but may limit or inhibit excessive excursion during adverse conditions. The first, reduced, radial stiffness may also reduce abrasion between the contact surface 302 of the brush seal land 204 and the brush 203 during minor radial excursions by the rotor.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A generally C-shaped brush seal land comprising:
    a concave annular structure configured to rotate with a turbine disc;
    a first portion of the concave annular structure configured to couple to an annular member extending from the turbine disc; and
    a second portion of the concave annular structure radially opposing the first portion and configured to deflect towards the first portion to close a clearance area between the second portion and the turbine disc in response to contact with a brush seal,
    wherein the second portion deflects through the clearance area in response to contact with the brush seal up to the point at which the second portion contacts the turbine disc, and does not deflect further due to contact between the second portion and the turbine disc.

2. The brush seal land of claim 1, wherein the brush seal land comprises an austenitic nickel-chromium alloy.

3. The brush seal land of claim 1, wherein the second portion includes a contact surface configured for contact with the brush.

4. The brush seal land of claim 3, wherein the contact surface comprises tungsten carbide.

5. The brush seal land of claim 1, wherein the brush seal land is configured to reduce abrasion to the annular member extending from the turbine disc.

6. The brush seal land of claim 1, wherein the brush seal land is configured to be used with a brush of the brush seal to separate a high pressure zone from a low pressure zone.

7. The brush seal land of claim 1, wherein the first portion is configured to be coupled to the turbine disc using pressure.

8. A brush seal comprising:
    a generally C-shaped brush seal land configured to be coupled to an annular extending member from a turbine disc; and
    a brush configured to make contact with the brush seal land, the brush seal land comprising:
        a concave annular structure configured to rotate with a turbine disc;
        a first portion of the concave annular structure configured to couple to an annular member extending from the turbine disc; and
        a second portion of the concave annular structure radially opposing the first portion and configured to deflect towards the first portion to close a clearance area between the second portion and the turbine disc in response to contact with a brush seal,
        wherein the second portion deflects through the clearance area in response to contact with the brush seal up to the point at which the second portion contacts the turbine disc, and does not deflect further due to contact between the second portion and the turbine disc.

9. The brush seal of claim 8, wherein the brush seal is configured to deflect in response to contact with the brush seal land.

10. The brush seal of claim 8, wherein the brush seal land comprises an austenitic nickel-chromium alloy.

11. The brush seal of claim 8, wherein the brush seal land comprises a contact surface configured for contact with the brush.

12. The brush seal of claim 11, wherein the contact surface comprises tungsten carbide.

13. The brush seal of claim 8, wherein the brush seal land and the brush separate a high pressure zone from a low pressure zone.

14. The brush seal of claim 8, wherein the first portion is coupled to the turbine disc by a pressure.

* * * * *